(12) United States Patent
Kim et al.

(10) Patent No.: US 8,699,440 B2
(45) Date of Patent: Apr. 15, 2014

(54) RESOURCE ALLOCATION METHOD FOR BROADBAND WIRELESS CONNECTION SYSTEM, AND APPARATUS FOR PERFORMING SAME

(75) Inventors: Jeong Ki Kim, Anyang-si (KR); Young Soo Yuk, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 13/264,324

(22) PCT Filed: Apr. 22, 2010

(86) PCT No.: PCT/KR2010/002535
§ 371 (c)(1), (2), (4) Date: Oct. 13, 2011

(87) PCT Pub. No.: WO2010/123299
PCT Pub. Date: Oct. 28, 2010

(65) Prior Publication Data
US 2012/0039288 A1 Feb. 16, 2012

Related U.S. Application Data

(60) Provisional application No. 61/171,836, filed on Apr. 22, 2009, provisional application No. 61/172,239, filed on Apr. 24, 2009, provisional application No. 61/180,436, filed on May 22, 2009, provisional application No. 61/180,895, filed on May 25, 2009.

(51) Int. Cl.
*H04W 4/00* (2009.01)
*H04J 1/16* (2006.01)
*H04J 3/16* (2006.01)

(52) U.S. Cl.
USPC ............ 370/329; 370/252; 370/341; 370/465

(58) Field of Classification Search
None
See application file for complete search history.

(56) References Cited

U.S. PATENT DOCUMENTS

| | | | |
|---|---|---|---|
| 2007/0298809 A1* | 12/2007 | So | 455/452.1 |
| 2008/0090584 A1 | 4/2008 | Kim et al. | |
| 2008/0130590 A1 | 6/2008 | Kim et al. | |
| 2009/0070650 A1 | 3/2009 | Bourlas et al. | |
| 2009/0075667 A1 | 3/2009 | Bourlas | |
| 2010/0054198 A1* | 3/2010 | Sung et al. | 370/329 |
| 2010/0246531 A1* | 9/2010 | Chang et al. | 370/331 |

FOREIGN PATENT DOCUMENTS

| | | | |
|---|---|---|---|
| KR | 10-2008-0041101 A | 5/2008 | |
| KR | 10-2009-0004070 A | 1/2009 | |

* cited by examiner

*Primary Examiner* — Yemane Mesfin
*Assistant Examiner* — Peter Chen
(74) *Attorney, Agent, or Firm* — Birch, Stewart, Kolasch & Birch, LLP

(57) ABSTRACT

The present invention relates to a broadband wireless connection system, and more particularly, to a method for a base station to more efficiently allocate resources to a terminal, and to an apparatus for performing same. In a broadband wireless connection system according to one aspect of the present invention, a method for a base station for continuously allocating resources comprises the steps of: determining a size and location of a continuous allocation resource to be allocated through continuous resource allocation; comparing the size and location of the determined continuous allocation resource with those of previously allocated continuous allocation resources; and transmitting a map information element (A-MAP IE) including resource allocation information set according to the results of the comparison to a terminal.

18 Claims, 9 Drawing Sheets

RESOURCE ALLOCATION METHOD FOR BROADBAND WIRELESS CONNECTION SYSTEM, AND APPARATUS FOR PERFORMING SAME

CROSS REFERENCE TO RELATED APPLICATIONS

This application is the National Phase of PCT/KR2010/002535 filed on Apr. 22, 2010, which claims priority under 35 U.S.C. 119(e) to U.S. Provisional Application No. 61/171,836 filed on Apr. 22, 2009, U.S. Provisional Application No. 61/172,239 filed on Apr. 24, 2009, U.S. Provisional Application No. 61/180,436 filed on May 22, 2009, and U.S. Provisional Application No. 61/180,895 filed on May 25, 2009, all of which are hereby expressly incorporated by reference into the present application.

FIELD OF THE INVENTION

The present invention relates to a broadband wireless access system, and more particularly to a method and apparatus for allowing a base station (BS) to more efficiently assign resources to a user equipment (UE).

BACKGROUND ART

In a mobile communication system, each base station transmits or receives data to or from a user equipment through one cell/sector in a wireless channel environment. In a system operated using multiple carriers or the like, a base station receives packet traffic from a wired Internet network and transmits the received packet traffic to each user equipment using a predetermined communication protocol. At this time, downlink scheduling includes determination as to when the base station transmits data, to which user equipment the data is transmitted, and which frequency region is used for data transmission. In addition, the base station receives and demodulates data from the user equipment using a predetermined communication protocol and transmits packet traffic through a wired Internet network. On the other hand, uplink scheduling includes determination as to when uplink data is transmitted to the base station, which user equipment transmits the uplink data, and which frequency band is used for uplink data transmission. In general, scheduling is performed such that a user equipment with a good channel status transmits or receives data using more time and frequency resources.

FIG. 1 is a diagram explaining time-frequency resource blocks. A resource used in communication in a system operated using multiple carriers or the like may be divided into a time domain and a frequency domain. The resource may be defined by Resource Blocks (RBs) and each RB includes N subcarriers and M subframes or a predetermined time unit. At this time, N and M may be 1. One rectangle shown in FIG. 1 denotes one RB, and one RB includes at least one subcarrier located on one axis and a predetermined time unit located on the other axis. In downlink, the base station selects a user equipment according to a predetermined scheduling rule, allocates one or more RBs to the selected user equipment, and transmits data to the selected user equipment using the allocated RBs. In uplink, the base station selects a user equipment and allocates one or more RBs to the selected user equipment according to predetermined scheduling rule. The user equipment receives scheduling information indicating that the base station has allocated certain RBs to the user equipment and transmits uplink data using the allocated RBs.

In the downlink scheduling scheme, the base station selects time-frequency RBs with a good channel status based on a downlink Channel Quality Indicator (CQI) reported by the user equipment and transmits data using the selected RBs. Since the time-frequency RBs with the good channel status are used, it is possible to transmit a larger amount of data while using restricted RBs. Thus, it is possible to increase overall data transfer capacity of the system. In the uplink scheduling scheme, a scheduler of the base station may measure the reception status of a pilot signal or a reference signal transmitted from the user equipment and select and allocate time-frequency RBs with a good uplink channel status to the user equipment. The user equipment may transmit uplink data using the allocated RBs.

Unicast service control information includes user-specific control information and non-user-specific control information. The non-user-specific control information may include information for enabling a user equipment to decode user-specific control information such as the size of user-specific control information.

Provided that user-specific control information is comprised of control information for user(s), the user-specific control information is further divided into resource assignment information, power control information, and Hybrid Automatic Repeat reQuest (HARQ) ACK/NACK feedback information. HARQ ACK/NACK feedback information for uplink data transmission is transmitted through a downlink ACK channel, and is distinguished from a control block of other user-specific control information.

In order to allocate resources to one or more user equipments contained in one group, group control information may be used. In this case, control information may be configured in the form of an A-MAP (Advanced-MAP). In association with intended user-specific control information of user(s), multiple information elements are respectively coded, and are masked with Cyclic Redundancy Check (CRC) of the A-MAP using UE IDs (including STID, broadcast STID, and multicast STID of each UE). Since A-MAP is separately encoded and masked with an STID, a UE performs blind detection of the A-MAP transmission region so as to determine the presence or absence of A-MAP to be transmitted to the UE. In this case, the UE may use STID, broadcast ID, and multicarrier ID (e.g., group ID, persistent ID, Sleep/Idle mode ID, MBS ID, etc.) that are assigned to the UE.

The UE may perform blind detection on the basis of the size of MAP used in the corresponding system, and may limit the MAP size to a predetermined size and also limit the type such that the number of blind detections is reduced. For example, the size of A-MAP IE (Information Element) may be limited to three types (for example, 56 (or 64), 96, and 144) or two types (for example, 56 (or 64), and 96). It is assumed that, when one minimum logical resource unit (MLRU) is composed of 48 data subcarriers or 2 MLRUs are composed of 96 data subcarriers, the size of A-MAP IE is set to 56 or 96. At this time, using the encoding method (e.g., tail-biting convolution code (TBCC) and puncturing) for a downlink control channel, A-MAP IE of 56 bits may be mapped to one MLRU, and A-MAP IE of 96 bits may be mapped to two MLRUs.

The above-mentioned scheduling may be carried out on a group basis.

Group resource allocation (GRA) technology allocates resources to multiple users contained in one group so as to reduce overhead of a control message that is transmitted from a BS to a UE. In the case of using the group resource allocation technology, resources are separately assigned to each UE, resource allocation position information (e.g., resource start offset and resource size), an MCS level of burst, etc. are compressed and transmitted to UEs, resulting in reduction in overhead of control information.

FIG. 2 is a diagram showing an example of a group resource allocation (GRA) method using bitmaps.

Referring to FIG. 2, bitmaps may be used to notify the UEs belonging to a predetermined group of resource allocation information. A user bitmap which is a first bitmap indicates which of mobile stations belonging to a specific group corresponding to the bitmap is scheduled at a time corresponding thereto. Each bit of the user bitmap corresponds one-to-one to each of UEs belonging to the group. In FIG. 2, one group may include six users at maximum. Each bit of the user bitmap set to "1" indicates a user (that is, a user, to which resources are allocated) currently scheduled in a frame.

FIG. 2 shows that first, second, fourth and sixth users are scheduled in an n-th frame (Frame n). Each UE may acquire information about its location in a group when being added to the group through a user bitmap received from the base station. Next, a resource allocation bitmap indicates resource allocation information of the scheduled users and the resource allocation information may include information such as an MCS (Modulation and Coding Scheme) level and the size of allocated resources. In FIG. 2, since information about one UE may be expressed by 3 bits and a total of four UEs are scheduled in the n-th frame, the size of the resource allocation bitmap becomes 12 bits (3×4). Since five UEs are scheduled in an (n+p)-th frame (Frame n+p), a resource allocation bitmap having a total size of 15 bits is formed.

The persistent allocation (PA) will hereinafter be described in detail.

In the same manner as in VoIP in which packet transmission can be predicted, periodic traffic transmission need not perform burst allocation signaling (i.e., resource allocation for transmission) for each packet transmission. In this case, persistent allocation (PA) may be used. That is, persistent allocation (PA) having a relatively fixed payload size can reduce overhead generated when resources are assigned to connection or service(s) having a periodic pattern. The BS can periodically allocate resources using initially assigned resources without use of a separate MAP during a predetermined time, resulting in a reduction in MAP overhead.

Position, size, and MCS information of resources transferred by a persistent allocation MAP are maintained by a base station and UE until modification, deletion, or error occurs in resource allocation.

In order to perform persistent allocation (PA) on only one UE, a base station (BS) transmits a DL/UL individual persistent A-MAP to a UE. In order to simultaneously perform persistent allocation for multiple UEs, the base station transmits a DL/UL composite persistent A-MAP to the UE.

The group resource allocation (GRA) method and the persistent allocation (PA) methods are designed to allocate resources to each UE using different A-MAP IEs. If each A-MAP IE always has the same format, or if a UE to be scheduled does not exist or is changed to another, unnecessary resource consumption may occur.

DETAILED DESCRIPTION OF THE INVENTION

Technical Problem

An object of the present invention is to provide a method and apparatus for more efficiently allocating group resources.

Another object of the present invention is to provide a method and apparatus for more efficiently performing persistent allocation.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing persistent allocation by a base station in a broadband wireless access system, the method including determining a size and position of persistent allocation resources to be allocated through persistent allocation; comparing the size and position of the determined persistent allocation resources with those of previously allocated persistent allocation resources; and transmitting a MAP information element (A-MAP IE) including resource allocation information established according to the comparison result to a user equipment.

In the comparison result, if the size of the determined persistent allocation resources is identical to that of the previously allocated persistent allocation resources whereas the position thereof is not consecutive to that of the previously allocated persistent allocation resources, the resource allocation information includes a resource offset field for indicating the location of the determined persistent allocation resources as an offset.

In the comparison result, if the determined persistent allocation resources and the previously allocated persistent allocation resources are different in size, and their positions are consecutive to each other, the resource allocation information includes an allocation size field for indicating the size of the determined persistent allocation resources.

In the comparison result, if the determined persistent allocation resources and the previously allocated persistent allocation resources are different in size and their positions are not consecutive to each other, the resource allocation information includes an allocation size field for indicating the size of the determined persistent allocation resources and a resource offset field for indicating the position of the determined persistent allocation resources as an offset.

The resource allocation information includes a resource allocation indicator field established according to the comparison result, wherein the resource allocation indicator field indicates whether an allocation size field indicating the size of the determined persistent allocation resources and a resource offset field indicating the position of the determined persistent allocation resources as an offset are included in the resource allocation information.

In the comparison result, if the determined persistent allocation resources and the previously allocated persistent allocation resources are different in size and their positions are not consecutive to each other, the resource allocation indicator field is set to 1, and the resource allocation information includes the resource offset field and the allocation size field.

In the comparison result, if the determined persistent allocation resources and the previously allocated persistent allocation resources are identical in size to each other and their positions are consecutive to each other, the resource allocation indicator field is set to 0, and the resource offset field and the allocation size field are excluded from the resource allocation information.

In another aspect of the present invention, a method for enabling a user equipment to persistently receive resources in a broadband wireless access system includes receiving a MAP information element (A-MAP IE) including a resource allocation indicator field from a base station; and determining a size and position of persistent allocation resources allocated to the user equipment using the MAP information element (A-MAP IE), wherein the resource allocation indicator field indicates whether an allocation size field indicating the size of the allocated persistent allocation resources and a resource offset field indicating the position of the determined persistent allocation resources as an offset are included in the MAP information element (A-MAP IE).

A value of the resource allocation indicator field is determined according to a comparison result acquired from the base station that compares the size and position of the allocated persistent allocation resources with those of the previously allocated persistent allocation resources.

In the comparison result, if the allocated persistent allocation resources and the previously allocated persistent allocation resources are different in size and their positions are not consecutive to each other, the resource allocation indicator field is set to 1, and the MAP information element (A-MAP IE) includes the resource offset field and the allocation size field.

In the comparison result, if the allocated persistent allocation resources and the previously allocated persistent allocation resources are identical in size to each other and their positions are consecutive to each other, the resource allocation indicator field is set to 0, and the resource offset field and the allocation size field are excluded from the MAP information element (A-MAP IE).

In another aspect of the present invention, a user equipment includes a processor; and a radio frequency (RF) module for transmitting and receiving an RF signal to and from an external part upon receiving a control signal from the processor, wherein the processor, upon receiving a MAP information element (A-MAP IE) including a resource allocation indicator field from a base station through the RF module, determines a size and position of persistent allocation resources allocated to the user equipment using the MAP information element (A-MAP IE), and the resource allocation indicator field indicates whether an allocation size field indicating the size of the allocated persistent allocation resources and a resource offset field indicating the position of the determined persistent allocation resources as an offset are included in the MAP information element (A-MAP IE).

A value of the resource allocation indicator field is determined according to a comparison result acquired from the base station that compares the size and position of the allocated persistent allocation resources with those of the previously allocated persistent allocation resources.

In the comparison result, if the allocated persistent allocation resources and the previously allocated persistent allocation resources are different in size and their positions are not consecutive to each other, the resource allocation indicator field is set to 1, and the MAP information element (A-MAP IE) includes the resource offset field and the allocation size field.

The processor is controlled to recognize a predetermined amount of resources as persistent allocation resources allocated to the user equipment, wherein the predetermined resources are spaced apart from the position of the previously allocated persistent allocation resources by a predetermined value indicated by the resource offset field and occupy a predetermined size indicated by the allocation size field.

In the comparison result, if the allocated persistent allocation resources and the previously allocated persistent allocation resources are identical in size to each other and their positions are consecutive to each other, the resource allocation indicator field is set to 0, and the resource offset field and the allocation size field are excluded from the MAP information element (A-MAP IE).

The processor is controlled to recognize a predetermined amount of resources as persistent allocation resources allocated to the user equipment, wherein the predetermined resources start just after the position of the previously allocated persistent allocation resources and occupy as much resources as the size of the previously allocated resources.

Effects of the Invention

As apparent from the above description, exemplary embodiments of the present invention have the following effects.

According to the embodiments of the present invention, a UE and a BS can more efficiently perform group resource allocation.

In addition, according to the embodiments of the present invention, when a base station performs persistent allocation for a user equipment, the position and size of resource are considered and contained in information related to resource allocation, resulting in a reduction in MAP overhead.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Figure 1:
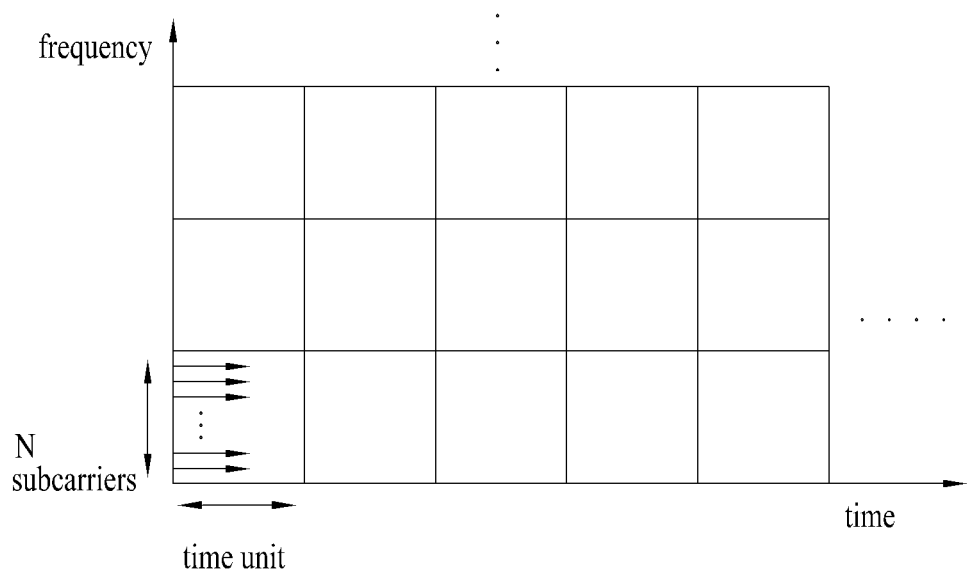
FIG. 1 is a diagram explaining time-frequency resource blocks.
Figure 2:
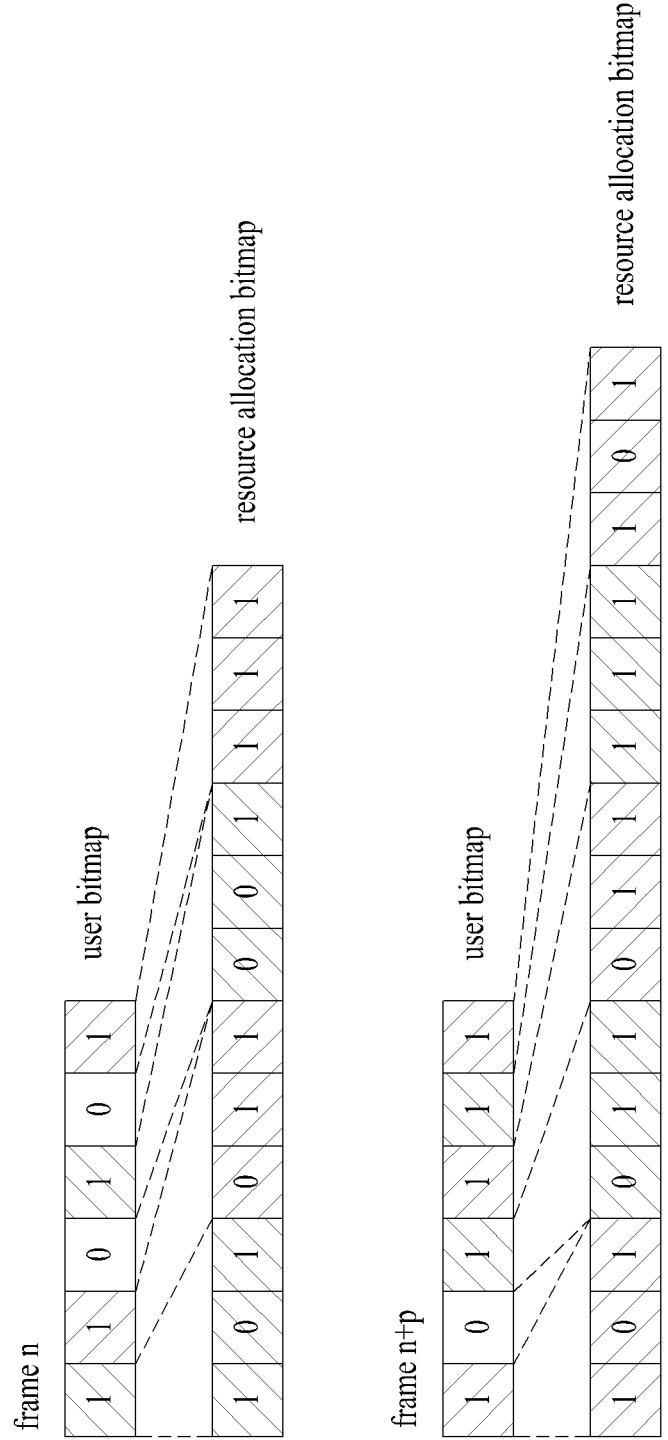
FIG. 2 is a diagram illustrating an example of a group resource allocation (GRA) method using bitmaps.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS), an Advanced MS (AMS) or a Subscriber Station (SS) as necessary.

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, steps or parts, description of which is omitted herein so as not to obscure the technical idea of the present invention, may be supported by the above documents. All terminology used herein may be supported by at least one of P802.16-2004, P802.16e-2005, P802.16Rev2, and IEEE 802.16m documents which are the standards of IEEE 802.16 system.

It should be noted that specific terms disclosed in the present invention are proposed for the convenience of description and better understanding of the present invention, and the use of these specific terms may be changed to another format within the technical scope or spirit of the present invention.

First Embodiment

One embodiment of the present invention provides a method for reducing unnecessary overhead in an A-MAP IE for group resource allocation.

In order to allocate resources to UEs belonging to a group, a base station selects UEs that must be added to the corresponding group, such that it has to add the selected UEs to the group. In order to allocate UEs by the base station, the base station transmits a group configuration message or a group configuration A-MAP IE to UEs. The base station transmits a group resource allocation A-MAP IE so as to allocate resources to one or more UEs belonging to the group.

The following Table 1 shows an example of DL GRA A-MAP IE, that is transmitted from a base station to a user equipment, so as to allocate DL resources to UEs belonging to the group.

TABLE 1

| Syntax | Size in bits * | Description/Notes |
|---|---|---|
| A-MAP IE Type | 4 | DL Group Resource Allocation A-MAP IE |
| Resource Offset | [6][8] | Indicates starting LRU for resource assignment to this group |
| ACK Channel Offset | TBD | Indicates the start of ACK index used for scheduled allocations at this subframe in the group. |
| NDA | [2][3] | Indicates the number of deleted AMSs in the group. |
| For(i=0,i++, i<NDA){ | | |
| User Bitmap Index | [5] | Indicates the User Bitmap Index of deleted AMSs. |
| A-MAP HFA | 4 | HARQ Feedback allocation for A-MAP transmission |
| } | | |
| User Bitmap Size | [2][5] | Indicates the length of User Bitmap |
| User Bitmap | Variable | Bitmap to indicate scheduled AMSs in a group. The size of the bitmap is equal to the User Bitmap Size |
| Resource Assignment Bitmap | Variable | Bitmap to indicate MCS/resource size for each scheduled AMS |
| Padding | Variable | Padding to reach byte boundary |
| MCRC | [16] | 16 bit masked CRC |

Referring to Table 1, in a group resource allocation (GRA) MAP, a resource offset field indicates the start position of resource allocation for the corresponding group using a logical resource unit (LRU), and an ACK channel offset indicates the start position of HARQ ACK index used for group resource allocation (GRA). In addition, the GRA MAP includes information (e.g., NDA and corresponding user bitmap index) of UEs deleted from the group. The corresponding user bitmap index indicates which one of UEs is deleted from the group. A maximum number of UEs capable of being deleted at one time is set to 4 in case of 2 bits, and is set to 8 in case of 3 bits. In addition, the GRA MAP includes resource allocation information (e.g., user bitmap size, user bitmap, and resource assignment bitmap). The resource assignment bitmap is changeable according to the number of scheduled UEs. Uplink GRA A-MAP may also have a field similar to that of downlink GRAM A-MAP.

As can be seen from Table 1, GRA MAP (hereinafter referred to as "GRA A-MAP IE") may include not only information for allocating resources to a UE belonging to the group, but also other information for deleting the UE from the group. When deleting one or more UEs belonging to the group, assuming that one or more scheduled UEs are not present in UEs belonging to the corresponding group, information unrelated to specific information for deleting a UE from the group at the corresponding time point may be overhead of a MAP. For example, GRA information (e.g., resource offset, ACK channel offset, user bitmap size, and user bitmap) may be considered to be MAP overhead.

For example, in the case where the size of assignment A-MAP IE is denoted by two units (i.e., 56 bits and 96 bits), the size of user bitmap is set to 12 bits, two UEs are deleted from the group, and a user to be scheduled at the corresponding time does not exist, the size of GRA A-MAP including CRC is denoted by about 67 bits (i.e., 4+8+4+3+(9×2)+5+12+16). In this case, GRA A-MAP IE may have the size of 96 bits.

In this case, since information requisite for GRA is about 29 bits long (8+4+5+12=29), some parts of information requisite for GRA are excluded when there is no scheduled UE, such that the size of GRA A-MAP IE may be set to 56. That is, overhead for GRA A-MA can be reduced. The above-mentioned method may be especially beneficial to the case in which the number of UEs to be deleted from the group is 3 or more.

Therefore, one embodiment of the present invention includes a variety of information (e.g., user bitmap size and user bitmap, resource offset, and ACK channel offset) requisite for GRA in a GRA A-MAP IE only when there is a scheduled UE.

For this purpose, the GRA A-MAP IE structure shown in the following table 2 may be used.

Table 2 shows an exemplary downlink GRA A-MAP IE structure applicable to one embodiment of the present invention.

TABLE 2

| Syntax | Size in bits * | Description/Notes |
|---|---|---|
| A-MAP IE Type | 4 | DL Group Resource Allocation A-MAP IE |
| NDA | [2][3] | Indicates the number of deleted AMSs in the group. |
| For(i=0,i++,i<NDA){ | | |
|    User Bitmap Index | [5] | Indicates the User Bitmap Index of deleted AMSs. |
|    A-MAP HFA | [4] | HFA (HARQ feedback allocation) for A-MAP |
| } | | |
| Existence of scheduled users | 1 | 0: There is no scheduled user 1: There are one or more scheduled users |
| If (Existence of scheduled users == 1) { | — | — |
| Resource Offset | [6][8] | Indicates starting LRU for resource assignment to this group |
| ACK Channel Offset | TBD | Indicates the start of ACK index used for scheduled allocations at this subframe in the group. |
| User Bitmap Size | [2][5] | Indicates the length of User Bitmap |
| User Bitmap | Variable | Bitmap to indicate scheduled AMSs in a group. The size of the bitmap is equal to the User Bitmap Size |
| ... | ... | ... |
| Resource Assignment Bitmap | Variable | Bitmap to indicate MCS/resource size for each scheduled AMS |
| } | | |
| Padding | Variable | Padding to reach byte boundary |
| MCRC | [16] | 16 bit masked CRC |

Referring to Table 2, the downlink GRA A-MAP. IE structure may include GRA-associated information only when there is at least one scheduled UE. In other words, if an 'Existence of scheduled users' field is set to 1, GRA information (such as a resource offset, an ACK channel offset, a user bitmap size, a user bitmap, a resource assignment bitmap, etc.) may be included.

In this way, if a scheduled UE is not present when a minimum unit of the A-MAP IE is 56 bits long as described above, a maximum of 3 UEs can be simultaneously deleted from the group using GRA A-MAP of 56 bits. Assuming that a minimum unit of GRA A-MAP IE is 64 bits long, a maximum of 4 UEs can be simultaneously deleted from the group.

Table 3 shows another example of a downlink GRA A-MAP IE structure applicable to one embodiment of the present invention.

TABLE 3

| Syntax | Size in bits * | Description/Notes |
|---|---|---|
| A-MAP IE Type | 4 | DL Group Resource Allocation A-MAP IE |
| NDA | [2][3] | Indicates the number of deleted AMSs in the group. |
| For(i=0,i++,i<NDA){ | | |
|    User Bitmap Index | [5] | Indicates the User Bitmap Index of deleted AMSs. |
|    A-MAP HFA | [4] | HFA (HARQ feedback allocation) for A-MAP |
| } | | |
| User Bitmap Size | [2][5] | Indicates the length of User Bitmap |
| User Bitmap | Variable | Bitmap to indicate scheduled AMSs in a group. The size of the bitmap is equal to the User Bitmap Size |
| If (The number of scheduled AMSs !=0 ) { | | The number of scheduled AMSs will be indicated by User Bitmap. |
| Resource Offset | [6][8] | Indicates starting LRU for resource assignment to this group |
| ACK Channel Offset | TBD | Indicates the start of ACK index used for scheduled allocations at this subframe in the group. |
| ... | ... | ... |
| Resource Assignment Bitmap | Variable | Bitmap to indicate MCS/resource size for each scheduled AMS |
| } | | |
| Padding | Variable | Padding to reach byte boundary |
| MCRC | [16] | 16 bit masked CRC |

Referring to Table 3, only when a 'user bitmap size' field and a 'user bitmap' field may always be included in the GRA A-MAP IE and the number of scheduled UEs indicated by the user bitmap field is 1 or higher, the remaining GRA-associated information (i.e., a resource offset, an ACK channel offset, a resource assignment bitmap, etc.) may be included.

Provided that an 'NDA' field indicating the number of deleted UEs is 2 bits long, the 'User Bitmap Size' field is 5 bits long, the 'User Bitmap' field is 12 bits, and a minimum unit of the A-MAP IE is 56 bits (or 64 bits) long, if there is no scheduled UE, a maximum of 3 UEs can be simultaneously deleted from the group using the GRA A-MAP of 56 bits (or 64 bits) shown in Table 3.

On the other hand, the 'User Bitmap Size' field generally indicates the size of user bitmap. Although there is no scheduled user, if at least one UE belonging to the group is present, the 'User Bitmap Size' field may be set to 0 or higher. In other words, the 'User Bitmap Size' field of may indicate that there is no scheduled user in the corresponding group. Information about the remaining GRA-associated information may be contained in the GRA A-MAP IE only when there is a scheduled user. The GRA A-MAP IE structure is shown in the following table 4.

Table 4 shows another example of a downlink GRA A-MAP IE structure applicable to one embodiment of the present invention.

TABLE 4

| Syntax | Size in bits * | Description/Notes |
|---|---|---|
| A-MAP IE Type | 4 | DL Group Resource Allocation A-MAP IE |
| NDA | [2][3] | Indicates the number of deleted AMSs in the group. |
| For(i=0,i++,i<NDA){ | | |
| User Bitmap Index | [5] | Indicates the User Bitmap Index of deleted AMSs. |
| A-MAP HFA | [4] | HFA (HARD feedback allocation) for A-MAP |
| } | | |
| User Bitmap Size | [2][5] | Indicates the length of User Bitmap If there is no scheduled user, User Bitmap size is set to 0. |
| If (User Bitmap Size!=0 ) { | | The number of scheduled AMSs will be indicated by User Bitmap. |
| User Bitmap | Variable | Bitmap to indicate scheduled AMSs in a group. The size of the bitmap is equal to the User Bitmap Size |
| Resource Offset | [6][8] | Indicates starting LRU for resource assignment to this group |
| ACK Channel Offset | TBD | Indicates the start of ACK index used for scheduled allocations at this subframe in the group. |
| ... | ... | ... |
| Resource Assignment Bitmap | Variable | Bitmap to indicate MCS/resource size for each scheduled AMS |
| } | | |
| Padding | Variable | Padding to reach byte boundary |
| MCRC | [16] | 16 bit masked CRC |

Referring to Table 4, only when the 'User Bitmap Size' field from among GRA information is always included in GRA A-MAP IE and one or more scheduled UEs indicated by the 'User Bitmap Size' field is present in the corresponding group, the remaining GRA-associated information (i.e., a resource offset, an ACK channel offset, a resource assignment bitmap, etc.) may be included in a DL/UL GRA A-MAP IE.

Provided that the 'NDA' field is 2 bits long, the 'User Bitmap Size' field is 5 bits long, the 'User Bitmap' field is 12 bits long, and a minimum unit of the A-MAP IE is 56 bits (or 64 bits) long, if there is no scheduled UE, a maximum of 3 UEs can be simultaneously deleted from the group using the GRA A-MAP of 56 bits (or 64 bits) shown in Table 4.

Therefore, GRA-associated information is included through the GRA A-MAP IE shown in Tables 2 to 4 only when there is a scheduled UE, resulting in a reduction in unnecessary overhead of a group resource allocation MAP.

Second Embodiment

Another embodiment of the present invention provides a method for reducing overhead of a persistent allocation MAP.

As described above, in order to perform persistent allocation for one UE, a base station transmits a DL/UL individual persistent A-MAP to the UE. In order to simultaneously perform persistent allocation for multiple UEs, the base station transmits a DL/UL composite persistent A-MAP to the UEs.

Table 5 shows an example of a general DL persistent A-MAP IE.

TABLE 5

| Syntax | Size in bits | Description/Notes |
|---|---|---|
| DL Persistent A-MAP_IE( ) { | — | — |
| A-MAP IE Type | 4 | DL Persistent A-MAP IE |
| if MCRC is masked with Station ID { | | |
| DL Individual Persistent A-MAP_IE( ) | | Refer to Table 665 |
| } else if MCRC is masked with Composite ID { | | |
| DL Composite Persistent A-MAP_IE( ) | | Refer to Table 666 |
| } | | |
| MCRC | [16] | 16 bit CRC masked by Station ID for individual PA and masked with composite ID (well-known ID specified in the system, TBD) for multi-user PA. |
| } | | |

If the base station transmits a DL persistent A-MAP IE to a UE for persistent allocation, and if MCRC of the persistent A-MAP is masked with a station ID (STID) and the masked result is transmitted, a DL persistent A-MAP IE includes a DL individual persistent A-MAP IE. If MCRC of the persistent A-MAP is masked with a composite ID and the masked result is transmitted, DL persistent A-MAP IE includes a DL composite persistent A-MAP IE. In this case, MCRC is cyclic redundancy check (CRC) bits composed of 16 bits.

The DL composite persistent A-MAP IE includes resource allocation information so as to allocate resources to each UE. In this case, the resource allocation information may include a resource offset, a start offset, and allocation size or duration information. However, the composite persistent A-MAP IE may include resource allocation information of multiple UEs.

Generally, if the allocation size is identical to that of a previous burst using a resource allocation indicator, the composite persistent MAP does not include a GRA-associated field. However, if only the allocation size is identical to that of the previous burst, the composite persistent A-MAP IE has to include a resource offset. If the persistent allocation is successively performed in the previous burst, the resource offset may be omitted.

The embodiment of the present invention provides a method for reducing overhead of a persistent A-MAP IE by removing the overlapped information.

That is, in order to reduce MAP overhead when the base station performs persistent resource allocation for multiple UEs using the composite persistent A-MAP IE, if the allocation size is identical to that of the previous burst, only resource offset information excluding the allocation size is included for resource allocation.

In addition, if resources are successively allocated to the previous burst, the base station may include only the allocation size other than resource offset information in the composite persistent A-MAP IE. If the allocation size is different from that of the previous burst and resources are not successively allocated to the previous burst, the base station may include resource allocation information including the allocation size and the resource offset in the composite persistent A-MAP IE.

Table 6 shows an example of a DL composite persistent allocation A-MAP IE structure according to another embodiment of the present invention.

TABLE 6

| Syntax | Size in bits | Description/Notes |
| --- | --- | --- |
| DL Composite Persistent A-MAP_IE( ) { | — | — |
| Number of allocations | 5 | Number of allocation specified |
| RCID Type | 2 | 0b00: Normal CID0b01: RCID110b10: RCID70b11: RCID3 |
| For (j=0;j<Number of allocations; j++) { | | For loop where each loop element specifies information for one allocation. |
| RAI | 2 | Resource Allocation Indicator (RAI)0b00: It indicates that resource allocation information is explicitly assigned for this subburst. 0b01: It indicates that resource offset is explicitly assigned for this subburst and this subburst will use the same allocation size as the previous subburst. 0b10: It indicates that this subburst will use the different allocation size as the previous subburst and follow the previous subburst. 0b11: It indicates that this subburst will use the same allocation size as the previous subburst and follow the previous subburst. If j is 1 then this indicator shall be 0b00. |
| if (RAI==0b00) { Resource Allocation | Variable | Variable number of bits - depends on system bandwidth. Information may include; Type of resource unit (DRU/CRU)Location (start/end) Allocation size |
| if (Nsubframe, A-MAP == 2){ Allocation Relevance | 1 | Subframe index when an A-MAP region occurs every 2 subframes (Nsubframe, A-MAP = 2) 0b0: Allocation in the first DL subframe relevant to an A-MAP region0b1: Allocation in the second DL subframe relevant to an A-MAP region |
| } } else if (RAI == 0b01) { Resource offset | TBD | Variable number of bits - depends on system bandwidth. It indicates the start position of resource region for this subburst |
| if (Nsubframe, A-MAP == 2){ Allocation Relevance | 1 | Subframe index when an A-MAP region occurs every 2 subframes (Nsubframe, A-MAP = 2) 0b0: Allocation in the first DL subframe relevant to an A-MAP region0b1: Allocation in the second DL subframe relevant to an A-MAP region |
| } } else if (RAI == 0b10) { Allocation size | TBD | Variable number of bits - depends on system bandwidth. It indicates the allocation size for this subburst |
| } Long TTI Indicator | 1 | Indicates number of subframes spanned by the allocated resource. 0b0: 1 subframe (default)0b1: 4 DL subframes for FDD or all DL subframes for TDD |
| HFA | [4] | TBDHARQ Feedback Allocation |
| } } | | |

Referring to Table 4, the composite persistent A-MAP IE may include a resource allocation indicator field composed of 2 bits so as to reduce MAP overhead. If the resource allocation indicator is set to '0b00', this means that resource allocation information including the resource offset and the allocation size is included in the MAP. In addition, the resource allocation indicator '0b01' means that the allocation size is identical to that of the previous burst. Therefore, the MAP includes only the resource offset other than the allocation size. The resource allocation indicator '0b01' means that allocation of the corresponding burst is performed successively to the previous burst, such that the MAP includes only the allocation size other than the resource offset. In addition, the resource allocation indicator '0b11' means that allocation of the corresponding burst is performed successively to the previous burst and the allocation size of the corresponding burst is identical to that of the previous burst. Accordingly, the resource allocation field including the allocation size and the resource offset is not included in the MAP.

Table 7 shows another example of a DL composite persistent allocation A-MAP IE structure according to another embodiment of the present invention.

TABLE 7

| Syntax | Size in bits | Description/Notes |
| --- | --- | --- |
| UL Composite Persistent A-MAP_IE( ) { | — | — |
| Number of allocations | 5 | Number of allocation specified |
| RCID Type | 2 | 0b00: Normal CID0b01: RCDID110b10: RCDID70b11: RCID3 |
| For (j=0;j<Number of allocations; j++) { | | For loop where each loop element specifies information for one allocation. |
| RAI | 2 | Resource Allocation Indicator (RAI)0b00: It indicates that resource allocation information is explicitly assigned for this subburst. 0b01: It indicates that resource offset is explicitly assigned for this subburst and this subburst will use the same allocation size as the previous subburst. 0b10: It indicates that this subburst will use the different allocation size as the previous subburst and follow the previous subburst. 0b11: It indicates that this subburst will use the same allocation size as the previous subburst and follow the previous subburst. If j is 1 then this indicator shall be 0b00. |
| if (RAI ==0b00) { | | |
| Resource Allocation | Variable | Variable number of bits - depends on system bandwidth. Information may include: Type of resource unit (DRU/CRU)Location (start/end) Allocation size |
| if ($N_{subframe, A-MAP}$ == 2){ if (DL:UL != 3:5){ | | |
| Allocation Relevance | 1 | Subframe index when an A-MAP region occurs every 2 subframes ($N_{subframe, A-MAP}$ = 2) and DL:UL subframe ratio is 8:0, 6:2, 4:4 or 5:3 0b0: Allocation in the first UL subframe relevant to an A-MAP region 0b1: Allocation in the second UL subframe relevant to an A-MAP region |
| }else if (DL:UL == 3:5){ | | |
| Allocation Relevance | 2 | Subframe index when an A-MAP region occurs every 2 subframes ($N_{subframe, A-MAP}$ = 2) and DL:UL subframe ratio is 3:5 i.e., the first A-MAP region is relevant to the first two UL subframes and the second A-MAP region is relevant to the last 3 UL subframes0b00: Allocation in the first UL subframe relevant to an A-MAP region 0b01: Allocation in the second UL subframe relevant to an A-MAP region 0b10: Allocation in the third UL subframe relevant to an A-MAP region0b11: reserved |
| } }else if ($N_{subframe, A-MAP}$ == 1 and DL:UL == 3:5){ | | |
| Allocation Relevance | 1 | Subframe index when an A-MAP region occurs every subframes ($N_{subframe, A-MAP}$ = 1) and DL:UL subframe ratio is 3:5 i.e., the first A-MAP region is relevant to the first UL subframe and the next two A-MAP regions are relevant to two UL subframes each.0b0: Allocation in the first UL subframe relevant to an A-MAP region 0b1: Allocation in the second UL subframe relevant to an A-MAP region |
| } } else if (RAI == 0b01) { | | |
| Resource offset | TBD | Variable number of bits - depends on system bandwidth. It indicates the start position of resource region for this subburst |
| if ($N_{subframe, A-MAP}$ == 2){ if (DL:UL != 3:5){ | | |
| Allocation Relevance | 1 | Subframe index when an A-MAP region occurs every 2 subframes ($N_{subframe, A-MAP}$ = 2) and DL:UL subframe ratio is 8:0, 6:2, 4:4 or 5:3 0b0: Allocation in the first UL subframe relevant to an A-MAP region |

TABLE 7-continued

| Syntax | Size in bits | Description/Notes |
|---|---|---|
| | | 0b1: Allocation in the second UL subframe relevant to an A-MAP region |
| }else if (DL:UL == 3:5){ | | |
| Allocation Relevance | 2 | Subframe index when an A-MAP region occurs every 2 subframes ($N_{subframe, A\text{-}MAP}$ = 2) and DL:UL subframe ratio is 3:5 i.e., the first A-MAP region is relevant to the first two UL subframes and the second A-MAP region is relevant to the last 3 UL subframes0b00: Allocation in the first UL subframe relevant to an A-MAP region 0b01: Allocation in the second UL subframe relevant to an A-MAP region 0b10: Allocation in the third UL subframe relevant to an A-MAP region0b11: reserved |
| } }else if ($N_{subframe, A\text{-}MAP}$ == 1 and DL:UL == 3:5){ | | |
| Allocation Relevance | 1 | Subframe index when an A-MAP region occurs every subframes ($N_{subframe, A\text{-}MAP}$ = 1) and DL:UL subframe ratio is 3:5 i.e., the first A-MAP region is relevant to the first UL subframe and the next two A-MAP regions are relevant to two UL subframes each. 0b0: Allocation in the first UL subframe relevant to an A-MAP region 0b1: Allocation in the second UL subframe relevant to an A-MAP region |
| } } } else if (RAI == 0b10) { | | |
| Allocation size | TBD | Variable number of bits - depends on system bandwidth. It indicates the allocation size for this subburst |
| } Long TTI indicator | 1 | Indicates number of subframes spanned by the allocated resource. 0b0: 1 subframe (default)0b1: 4 DL subframes for FDD or all DL subframes for TDD |
| HFA | [4] | TBDHARQ Feedback Allocation |
| ... } } | ... | ... |

Referring to Table 7, a UL composite persistent A-MAP IE may selectively include a resource allocation indicator (RAI) field in the same manner as in downlink. Detailed description of the RAI field is identical to that of Table 6, such that the same parts may herein be omitted for convenience and clarity of description.

Table 8 shows another example of a DL composite persistent allocation A-MAP IE according to another embodiment of the present invention.

TABLE 8

| Syntax | Size in bits | Description/Notes |
|---|---|---|
| DL Composite Persistent A-MAP_IE( ) { | — | — |
| Number of allocations | 5 | Number of allocation specified |
| RCID Type | 2 | 0b00: Normal CID0b01: RCID110b10: RCID70b11: RCID3 |
| For (j=0;j<Number of allocations; j++) { | | For loop where each loop element specifies information for one allocation. |
| Resource Allocation Indicator | 1 | If Resource Allocation Indicator is 1, it indicates that resource allocation (location and allocation size(duration)) is explicitly assigned for this subburst. Otherwise, this subburst will use the same Duration as the previous subburst. This subburst will follow the previous subburst. If j is 1 then this indicator shall be 1. |

TABLE 8-continued

| Syntax | Size in bits | Description/Notes |
|---|---|---|
| if (Resource Allocation Indicator==1) { | | |
| Resource Allocation | Variable | Variable number of bits - depends on system bandwidth. Information may include: Type of resource unit (DRU/CRU)Location (start/end)Allocation size |
| if (Nsubframe, A-MAP == 2){ | | |
| Allocation Relevance | 1 | Subframe index when an A-MAP region occurs every 2 subframes (Nsubframe, A-MAP = 2) 0b0: Allocation in the first DL subframe relevant to an A-MAP region0b1: Allocation in the second DL subframe relevant to an A-MAP region |
| } | | |
| } | | |
| Long TTI Indicator | 1 | Indicates number of subframes spanned by the allocated resource. 0b0: 1 subframe (default)0b1: 4 DL subframes for FDD or all DL subframes for TDD |
| HFA | [4] | TBDHARQ Feedback Allocation |
| } | | |
| } | | |

Differently from Table 6 or 7, Table 8 shows information as to whether resource allocation information is included using the resource allocation indicator (RAI) composed of 1 bit.

That is, in the case where the allocation size of the corresponding burst is different from that of the previous burst and allocation of the corresponding burst is not performed successively to the previous burst, RAI is set to 1 and resource allocation information is included in the corresponding MAP. In contrast, in the case where the allocation size of the corresponding burst (or the sub-burst) is identical to that of the previous sub-burst and the corresponding burst is allocated successively to the previous burst, the RAI field is set to zero and the resource allocation information is not included in the corresponding MAP.

Table 9 shows another example of a DL composite persistent allocation A-MAP IE structure according to another embodiment of the present invention.

TABLE 9

| Syntax | Size in bits | Description/Notes |
|---|---|---|
| DL Composite Persistent A-MAP_IE( ) { | — | — |
| Number of allocations | 5 | Number of allocation specified |
| RCID Type | 2 | 0b00: Normal CID0b01: RCID110b10: RCID70b11: RCID3 |
| For (j=0;j<Number of allocations; j++) { | | For loop where each loop element specifies information for one allocation. |
| Resource Allocation Indicator | 1 | If Resource Allocation indicator is 1, it indicates that resource allocation (location and allocation size(duration)) is explicitly assigned for this subburst. Otherwise, this subburst will use the same Duration as the previous subburst. If j is 1 then this indicator shall be 1. |
| if (Resource Allocation Indicator ==1) { | | |
| Resource Allocation | Variable | Variable number of bits - depends on system bandwidth. Information may include: Type of resource unit (DRU/CRU)Location (start/end)Allocation size |
| if (Nsubframe, A-MAP == 2){ | | |
| Allocation Relevance | 1 | Subframe index when an A-MAP region occurs every 2 subframes (Nsubframe, A-MAP = 2) 0b0: Allocation in the first DL subframe relevant to an A-MAP region0b1: Allocation in the second DL subframe relevant to an A-MAP region |
| } | | |
| } else { | | |
| Resource offset | | |
| if (Nsubframe, A-MAP == 2){ | | |
| Allocation Relevance | 1 | Subframe index when an A-MAP region occurs every 2 subframes (Nsubframe, |

TABLE 9-continued

| Syntax | Size in bits | Description/Notes |
|---|---|---|
| | | A-MAP = 2) 0b0: Allocation in the first DL subframe relevant to an A-MAP region0b1: Allocation in the second DL subframe relevant to an A-MAP region |
| } } Long TTI Indicator | 1 | Indicates number of subframes spanned by the allocated resource. 0b0: 1 subframe (default)0b1: 4 DL subframes for FDD or all DL subframes for TDD |
| HFA } } | [4] | TBDHARQ Feedback Allocation |

In Table 9, the RAI field of 1 bit is used in the same manner as in Table 8. However, the RAI field indicates whether the corresponding burst is allocated successively to the previous burst.

In other words, in the case where the allocation size of the corresponding burst (subburst) is different from that of the previous burst and the corresponding burst is not allocated successively to the previous burst, the RAI field is set to 1 and the resource allocation information is included in the corresponding MAP. In contrast, in the case where the allocation size of the corresponding burst (subburst) is identical to that of the previous burst and the corresponding burst is not allocated successively to the previous burst, the RAI field is set to zero and the resource offset instead of the resource allocation information is included in the corresponding MAP.

Therefore, through the composite persistent A-MAP IE shown in Tables 6 to 9, resource allocation information may be selectively included according to the relative allocation size and position between the corresponding burst and the previous burst, resulting in a reduction in MAP overhead.

On the other hand, the embodiment of the present invention also provides a more general persistent A-MAP IE. In the case where resources are allocated to multiple users using one persistent allocation A-MAP IE and the resource allocation is successively generated, current allocation is performed after the previous allocation. In this case, the operation for including a resource offset field in each allocation may encounter PA MAP overhead, and a detailed description thereof will hereinafter be described with reference to Table 10.

Table 10 shows an example of a persistent allocation A-MAP IE according to another embodiment of the present invention.

TABLE 10

| Syntax | Size | Notes |
|---|---|---|
| DL PA A-MAP IE ( ) { | — | — |
| AMAP type | 4 | DL PA A-MAP IE |
| Number of allocations | 5 | Number of allocation specified |
| ... | ... | ... |
| For (j=0; j< Number of allocations; j++) { | | |
| Duration indicator | 1 | If Duration Indicator is 1, it indicates that Duration is explicitly assigned for this subburst (allocation or deallocation). Otherwise, this subburst (allocation or deallocation) will use the same Duration as the previous subburst. |
| Resource offset indicator | 1 | If Resource Offset Indicator is 1, it indicates that Resource offset |

TABLE 10-continued

| Syntax | Size | Notes |
|---|---|---|
| | | is explicitly assigned for this persistent allocation. Otherwise, this allocation will follows the previous allocation immediately |
| If (Duration Indicator = 1) { Duration } | TBD | Duration in number of LRUs. |
| If (Resource offset Indicator = 1) { Resource offset } | TBD | Indicates the start of this persistent allocation. |
| ... | ... | ... |
| } Padding | variable | Padding to bytes boundary; padding value shall be set to zero. |
| } | | |

Referring to Table 10, a resource offset indicator field is added to the persistent A-MAP IE. If the resource offset indicator is set to 1, this means that the resource offset is explicitly included in the corresponding MAP. In contrast, if the resource offset indicator is set to zero, this means that the current allocation resource is located just after the previous allocation such that the resource offset is omitted.

Third Embodiment

Another embodiment of the present invention provides a MAP structure and extended header structure for efficient persistent allocation.

When the base station performs persistent resource allocation to one UE in downlink, it can allocate multiple persistent resources to one UE. If it is assumed that a packet transmitted to a resource region to which the UE is allocated is transmitted using a compact header, a flow ID (FID) field is not present in the compact header, such that it is impossible for the UE receiving a MAC protocol data unit (MPDU) to recognize which flow (service) is associated with a packet of the corresponding MPDU.

In order to solve the above-mentioned problem, another embodiment of the present invention provides a method for including a flow ID (FID) in a DL PA A-MAP IE. As a result, the UE can recognize an FID corresponding to a packet, and can identify the received packet and transmit the identified packet to a higher layer. The above-mentioned concept may also be similarly applied to the UL PA A-MAP IE, and a detailed description thereof will hereinafter be described with reference to Table 11.

Table 11 shows an example of a DL PA A-MAP IE according to another embodiment of the present invention.

TABLE 11

| Syntax | Size | Notes |
|---|---|---|
| DL Persistent A-MAP IE ( ) { | — | — |
| AMAP type | 4 | DL Persistent A-MAP IE |
| Number of allocations | 5 | Number of allocation specified |
| ... | ... | ... |
| For (j=0; j< Number of allocations; j++) { | | |
| ... | ... | ... |
| Duration indicator | 1 | If Duration Indicator is 1, it indicates that Duration is explicitly assigned for this subburst (allocation or deallocation). Otherwise, this subburst (allocation or deallocation) will use the same Duration as the previous subburst. |
| If (Duration Indicator = 1) { | | |
| Duration | TBD | Duration in number of LRUs. |
| } | | |
| Slot offset | TBD | Indicates the start of this persistent allocation. |
| ... | | |
| } | | |
| Padding | variable | Padding to bytes boundary; padding value shall be set to zero. |
| } | | |

Referring to Table 11, each allocation information of the PA A-MAP IE includes an FID. The PA A-MAP IE may further include the resource offset indicator field of Table 10. In this way, MAP including FID can be more efficiently used in the case where the compact header is used in the service employing persistent allocation resources.

In the meantime, in order to perform de-allocation when multiple persistent allocation resources are allocated to one transmission time interval (TTI), there is a need for the UE to recognize which one of persistent allocation resources is allocated. For this purpose, the embodiment of the present invention provides a method for including an FID in de-allocation signaling information by the base station and transmitting the resultant signaling information to the UE. In this case, the de-allocation signaling may be a PA A-MAP IE, and may also be a de-allocation extended header (e.g., a PA de-allocation extended header).

Figure 3:
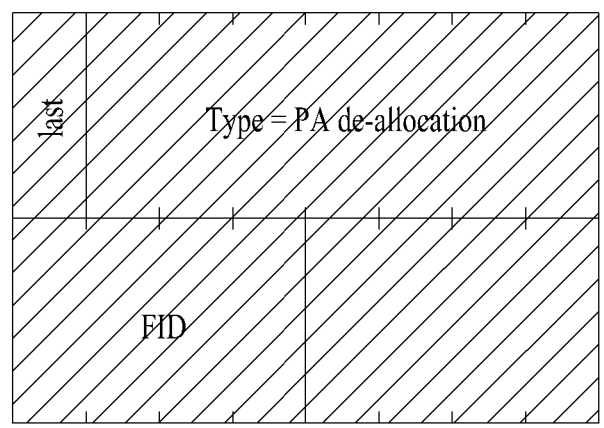
FIG. 3 is a diagram illustrating a de-allocation extended header structure according to an embodiment of the present invention.

FIG. 3 is a diagram illustrating a de-allocation extended header structure according to another embodiment of the present invention.

Referring to FIG. 3, the de-allocation extended header for de-allocating resources allocated through persistent allocation may include a last field indicating whether a different extended header is carried, a type field having a specific value indicating persistent de-allocation, and an FID field. The UE obtains an FID through the extended header of FIG. 3, it may de-allocate resources connected to the corresponding FID.

As another method for de-allocating persistent allocation resources, a reduced flow identifier (RFID) (also called a transport FID) may be used. In this case, RFID may indicate an identifier for identifying a flow using 2 or 3 bits. The RFID may be classified into three types.

In the first type, RFID may be adapted to indicate the order of UE-allocated FIDs, and a detailed description thereof will hereinafter be described with reference to FIG. 4.

Figure 4:
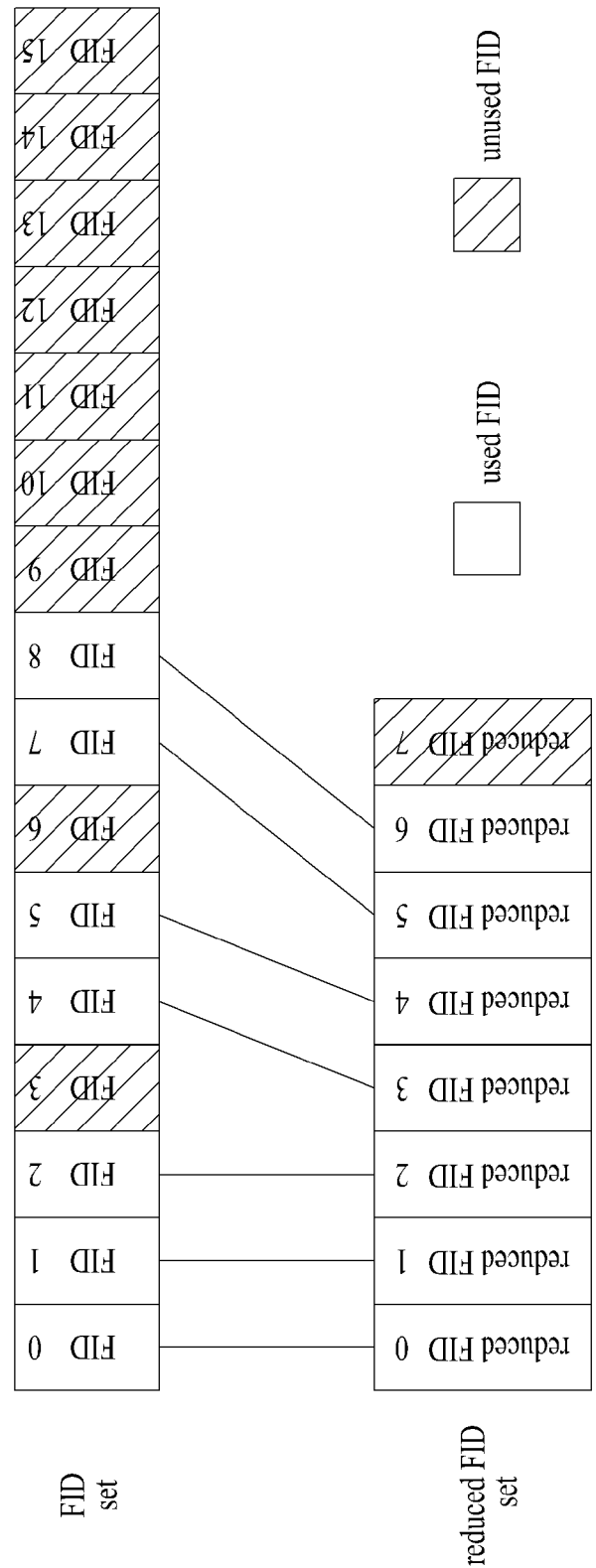
FIG. 4 shows one example of usage types of a reduced FID according to an embodiment of the present invention.

FIG. 4 shows one example of usage types of a transport FID according to an embodiment of the present invention.

Referring to FIG. 4, it is assumed that three reserved FIDs (FID[0~2]) are present, three transport FIDs [3, 5, 9] are allocated, and an arbitrary UE uses a total of 6 FIDs. In this case, 3 bits are large enough for RFID of the corresponding UE. In other words, RFID of 3 bits sequentially indicates FIDs. For example, FIDs may be used in the order of 'FID 0=RFID 0', 'FID 1=RFID 1', 'FID 2=RFID 2', 'FID 3=RFID 3', 'FID 5=RFID 4', 'FID 9=RFID 5', and 'RFID 6~8=reserved'.

In the second type, RFID may be adapted to indicate the order of UE-allocated transport FIDs, and a detailed description thereof will hereinafter be described with reference to FIG. 5.

Figure 5:
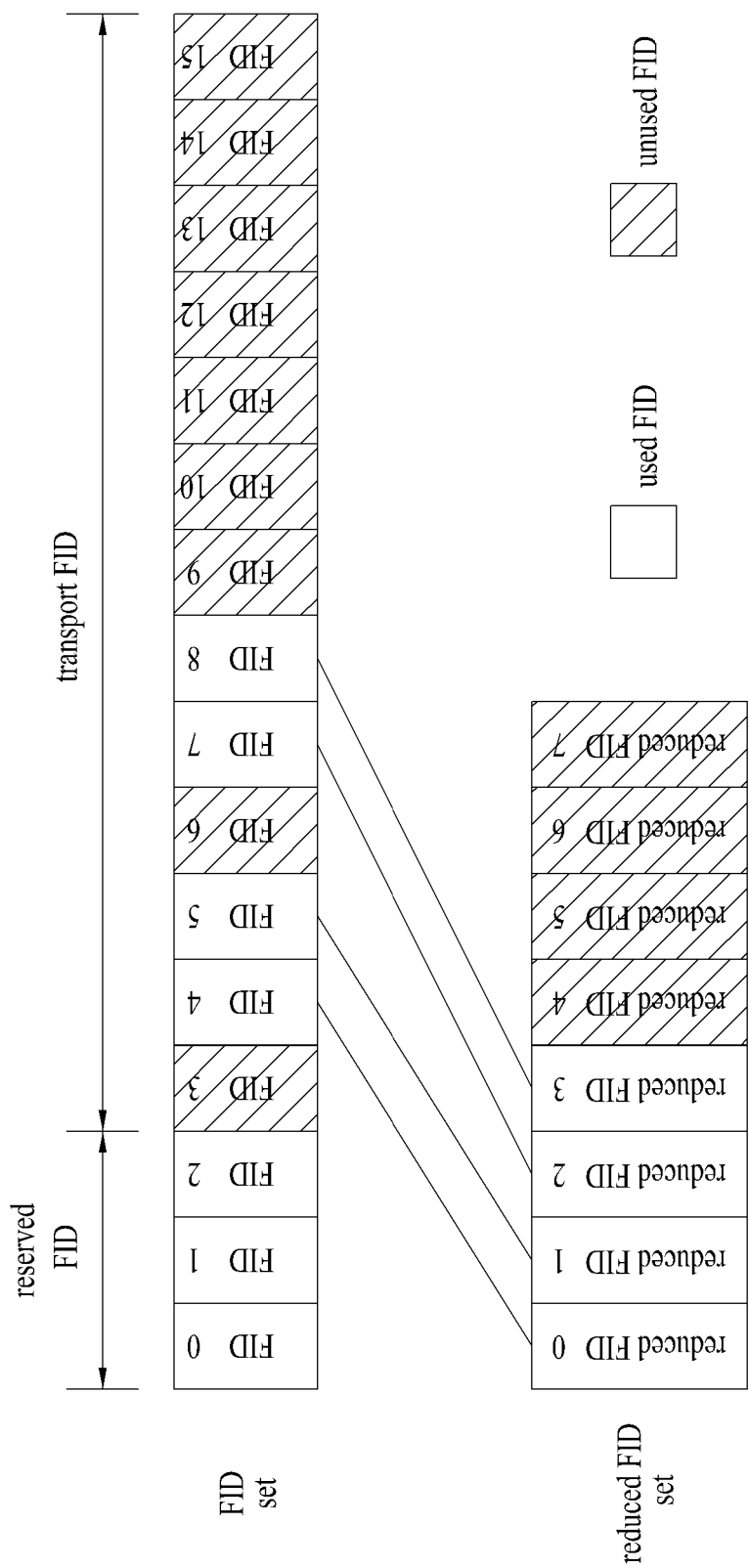
FIG. 5 shows another example of usage types of a reduced FID according to another embodiment of the present invention.

FIG. 5 shows another example of usage types of a reduced FID according to another embodiment of the present invention.

Referring to FIG. 5, in the case where an arbitrary UE receives 'FID 3', 'FID 7' and 'FID 11' as transport FIDs, three FIDs may be sequentially mapped to RFID. In other words, FIDs may be mapped in the order of 'RFID 0=FID 3', 'RFID 1=FID 7', and 'RFID 2=FID 11'. In this case, 2 bits are sufficient for RFID. If necessary, 3 bits may also be used for RFID.

In the third type, RFID may be adapted to indicate the order of PA FIDs from among UE-allocated transport FIDs, and a detailed description thereof will hereinafter be described with reference to FIG. 6.

Figure 6:
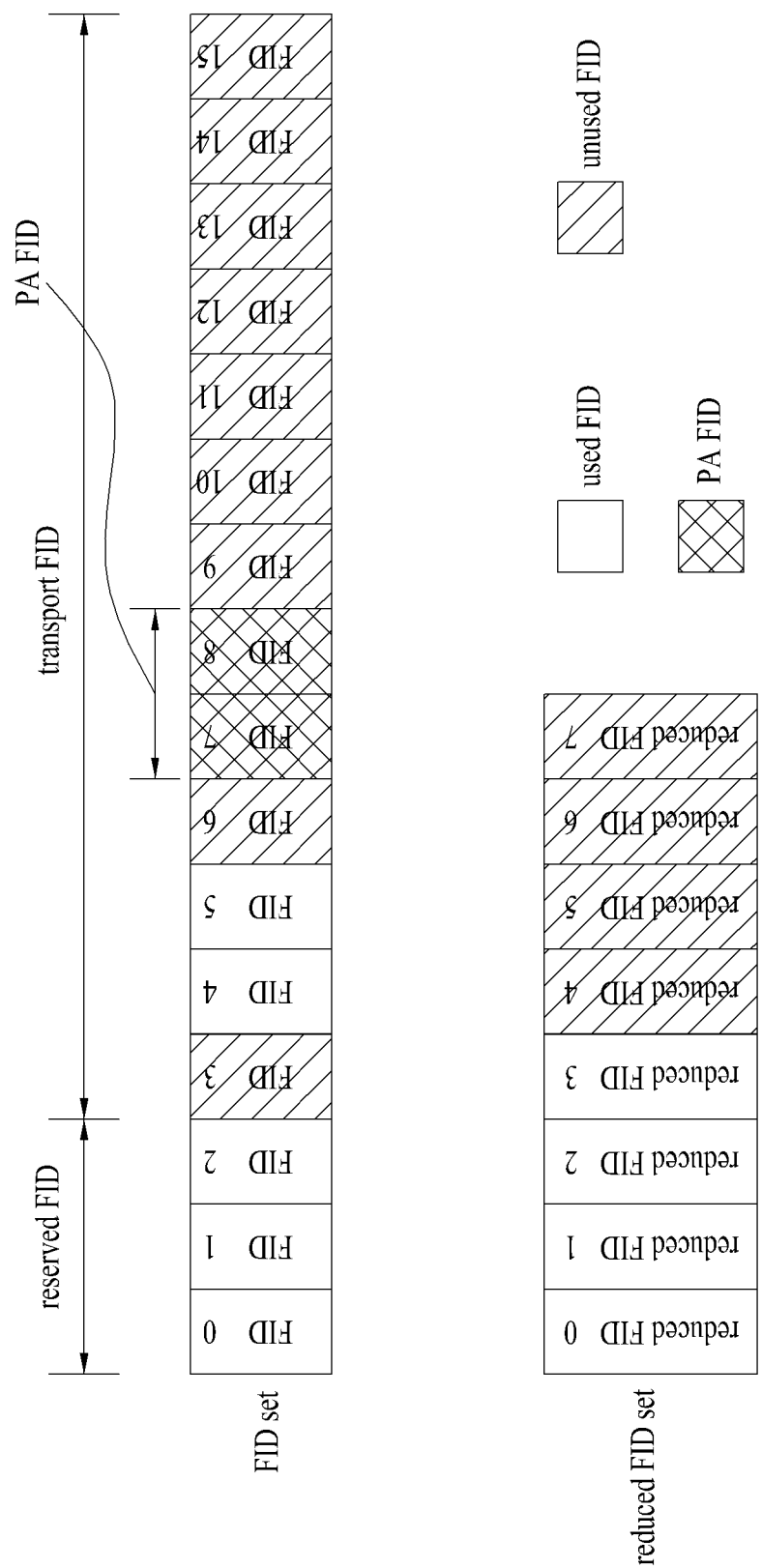
FIG. 6 shows another example of usage types of a reduced FID according to another embodiment of the present invention.

FIG. 6 shows another example of usage types of a reduced FID according to another embodiment of the present invention.

Referring to FIG. 6, assuming that the UE is assigned five transport FIDs and two FIDs (FID 3 and FID 5) from among the five transport FIDs are assigned to persistent allocation, RFID 0 may be mapped to FID 3 and RFID 1 may be mapped to FID 5.

The number of persistent allocations capable of being provided to one UE in the IEEE 802.16m system may be limited to a maximum of 4 or 8 in downlink and uplink. Provided that the number of multiple persistent allocations assigned to one UE is set to 4, two calls can be supported. At this time, RFID may be 2 bits long. In addition, provided that the number of multiple persistent allocations assigned to one UE is set to 8, four calls may be supported. In this case, RFID may be 3 bits long.

However, when using the above-mentioned three RFID usage methods, the number of FIDs assigned to one UE exceeds a predetermined number such that RFID may require the size of more than 3 bits. In this case, the extended header is applied only to FIDs capable of being covered by RFID such that persistent allocation (PA) de-allocation may be carried out.

For example, when RFID of 3 bits is used although the number of allocated FIDs is 9, PA de-allocation is applied only to initial 8 FIDs, PA de-allocation of the remaining one FID may be performed through another method (e.g., persistent allocation MAP) but not the extended header method.

The extended header structure will hereinafter be described with reference to FIGS. 7 and 8.

Figure 7:
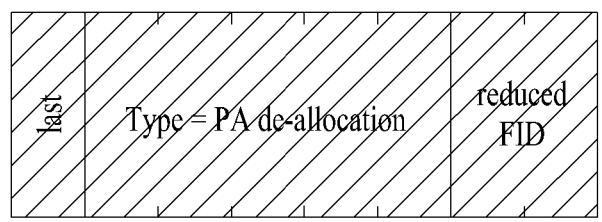
FIGS. 7 and 8 show examples of the extended header structure using a reduced FID so as to perform persistent allocation de-allocation according to another embodiment of the present invention.
Figure 8:
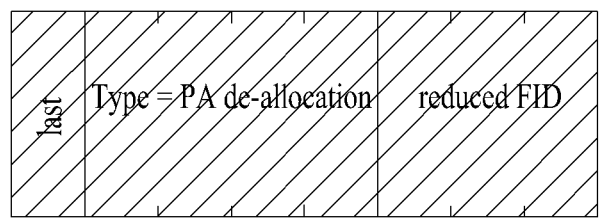

FIGS. 7 and 8 show examples of the extended header structure using a reduced FID so as to perform persistent allocation de-allocation according to another embodiment of the present invention.

In FIG. 7, if the extended header type field is 5 bits long, a reduced FID of 2 bits is used. In FIG. 8, if the extended header type field is 4 bits long, a reduced FID of 3 bits is used.

The extended header format for use in the case where the above-mentioned second-type RFID is used will hereinafter be described with reference to FIGS. 9 and 10.

Figure 9:
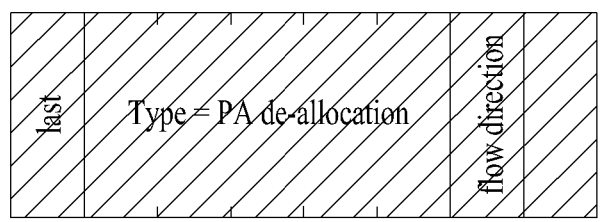
FIGS. 9 and 10 show other examples of the extended header structure using a reduced FID so as to perform persistent allocation de-allocation according to another embodiment of the present invention.
Figure 10:
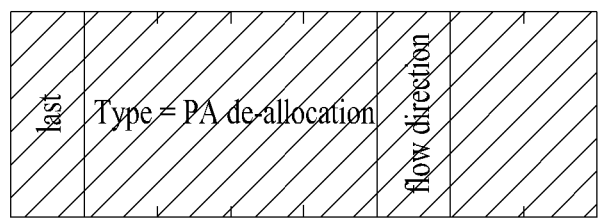

FIGS. 9 and 10 show other examples of the extended header structure using a reduced FID so as to perform persistent allocation de-allocation according to another embodiment of the present invention.

In FIGS. 9 and 10, it is assumed that only one PA is supported in uplink and only one PS is supported in downlink. In this case, if multiple PAs are not supported in one UE, an FID is not included in the extended header, and a specific field for discriminating between uplink and downlink may be included, such that the UE can recognize which PA is de-allocated. In other words, the extended header for PA de-allocation may include a UL/DL ID (e.g., a flow direction) of 1 bit.

One flow direction of '0b0' may indicate downlink, and the other flow direction of '0b1' may indicate uplink, or vice versa.

FIG. 9 shows the extended header type field of 5 bits, and FIG. 10 shows the extended header type field of 4 bits.

User Equipment (UE) and Base Station (BS) Structures

Now a description will be given of a UE and a BS (femto BS (FBS) and macro BS (MBS)) for implementing the above-described exemplary embodiments of the present invention, according to another exemplary embodiment of the present invention.

The UE may operate as a transmitter on an uplink and as a receiver on a downlink, while the BS may operate as a receiver on the uplink and as a transmitter on the downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 11.

Figure 11:
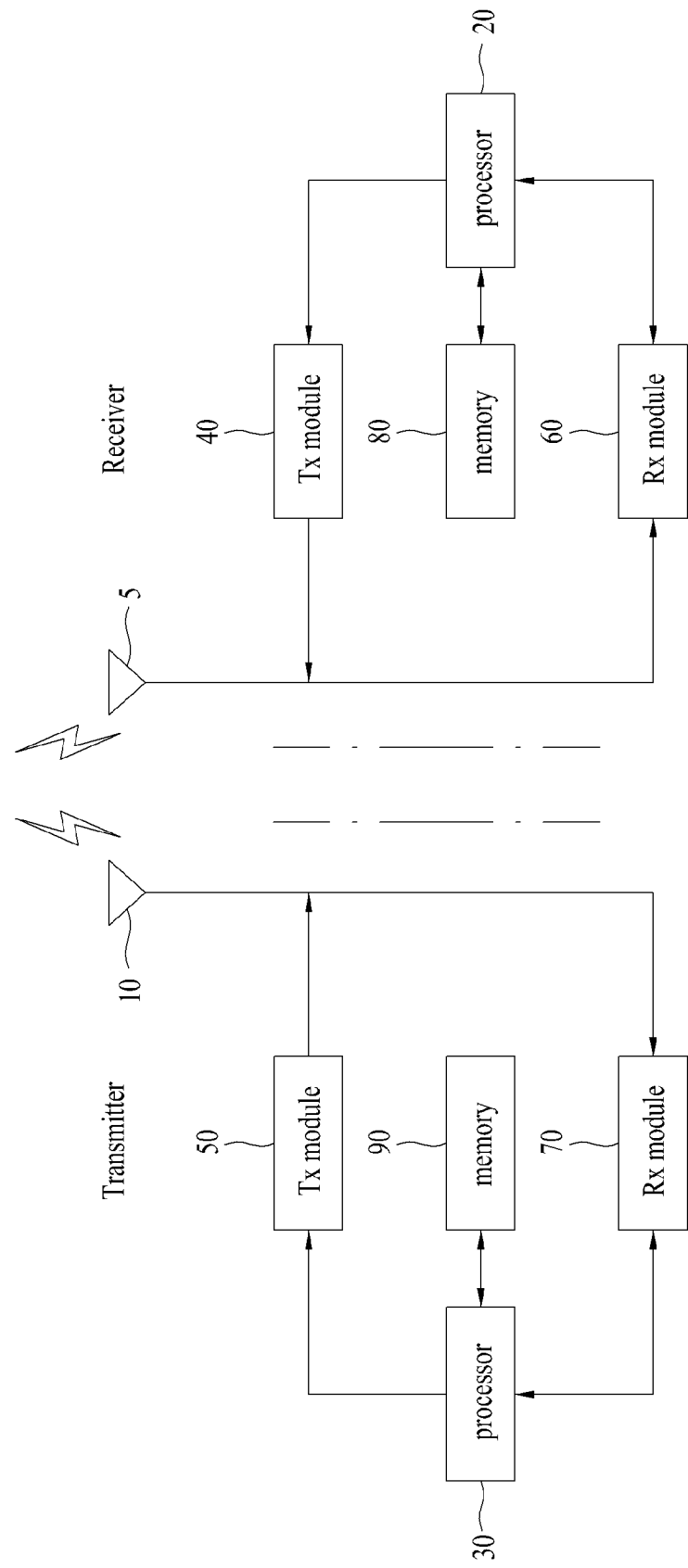
FIG. 11 is a block diagram illustrating a transmitter and a receiver according to one embodiment of the present invention.

FIG. 11 is a block diagram of a transmitter and a receiver according to another exemplary embodiment of the present invention.

Referring to FIG. 11, the left part corresponds to the transmitter and the right part corresponds to the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are the counter parts of those of the receiver. The components of the transmitter and the receiver will be described below in more detail.

The antennas 5 and 10 include Tx antennas for transmitting signals generated from Tx modules 40 and 50 and Rx antennas for receiving radio frequency (RF) signals and providing the received RF signals to the Rx modules 60 and 70. If Multiple Input Multiple Output (MIMO) is supported, two or more antennas may be provided.

Each of the antenna, the Tx module, and the Rx module may include an RF module therein.

The processors 20 and 30 generally provide overall control to the AMS. Especially, the processors 20 and 30 may perform a controller function for implementing the above-described exemplary embodiments of the present invention, variable MAC frame control function based on service characteristics and a propagation environment, a handover (HO) function, an authentication and encryption function, etc. In more detail, the processors 20 and 30 may provide overall control to the random access procedure.

Specifically, provided that PA/GRA MAP is acquired through a radio frequency (RF) module, the UE processor may determine information about inclusion or non-inclusion of resource allocation information, information about the allocated resource size, and information about a resource offset using various values of fields contained in the corresponding MAP. In addition, the UE processor may determine an FID that is de-allocated through the extended header of a packet received from the base station (BS).

Further, the UE processor may provide overall control to the operations described in the above-mentioned embodiments.

The Tx modules 40 and 50 may encode and modulate transmission data scheduled by the processors 20 and 30 according to a predetermined coding and modulation scheme and provide the modulated data to the antenna 10.

The Rx modules 60 and 70 may recover original data by demodulating and decoding data received through the antennas 5 and 10 and provide the recovered data to the processors 20 and 30.

The memories 80 and 90 may store programs for processing and control of the processors 20 and 30 and temporarily store input/output (I/O) data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the method and UE for more efficiently performing group resource allocation (GRA) and persistent allocation (PA) operations in a broadband wireless access system according to the embodiments of the present invention have been disclosed on the basis of only an IEEE 802.16m system application, it should be noted that the embodiments are also applicable not only to an IEEE 802.xx system but also to other wireless mobile communication systems.

The invention claimed is:

1. A method for performing persistent allocation by a base station in a broadband wireless access system, the method comprising:
determining a size and a position of persistent allocation resources to be allocated through persistent allocation;
comparing the size and the position with a previously determined size and a previously determined position of the allocated persistent allocation resources; and
transmitting a MAP information element (A-MAP IE) to a user equipment (UE), the A-MAP IE including a resource allocation indicator field established according to the comparison result, the resource allocation indicator field indicating whether an allocation size field indicating the size of persistent allocation resources and a resource offset field indicating the position of persistent allocation resources as an offset value are included in the A-MAP IE,
wherein, when the size is different from the previously determined size of the allocated persistent allocation resources, and when the position is not consecutive to the previously determined position of the allocated persistent allocation resources, the resource allocation indicator field is set to a first value, and the A-MAP IE includes the resource offset field and the allocation size field, and
wherein, when the size is the same as the previously determined size of the allocated persistent allocation resources, and when the position is consecutive to the previously determined position of the allocated persistent allocation resource, the resource allocation indicator field is set to a second value, and the resource offset field and the allocation size field are excluded from the A-MAP IE.

2. The method according to claim 1, wherein, when the size is the same as the previously determined size of the allocated persistent allocation resources, and when the position is not consecutive to the previously determined position of the allocated persistent allocation resources, the resource allocation indicator field is set to a third value, and the A-MAP IE includes the resource offset field.

3. The method according to claim 1, wherein, when the size is different from the previously determined size of the allocated persistent allocation resources, and when the position is consecutive to the previously determined position of the allocated persistent allocation resource, the resource allocation indicator field is set to a fourth value, and the A-MAP IE includes the allocation size field.

4. The method according to claim 1, wherein the first value is 1.

5. The method according to claim 1, wherein the second value is 0.

6. The method according to claim 1, wherein the A-MAP IE is a composite persistent allocation A-MAP IE for performing persistent allocation to one or more UEs.

7. A method for enabling a user equipment to persistently receive resources in a broadband wireless access system, the method comprising:
receiving a MAP information element (A-MAP IE) including a resource allocation indicator field from a base station; and
determining a size and a position of persistent allocation resources allocated to the user equipment using the A-MAP,
wherein the resource allocation indicator field indicates whether an allocation size field indicating the size and a resource offset field indicating the position as an offset value are included in the A-MAP IE,
wherein a value of the resource allocation indicator field is determined according to a comparison result acquired from the base station that compares the size and the position with a previously determined size and a previously determined position of the allocated persistent allocation resources,
wherein, when the size is different from the previously determined size of the allocated persistent allocation resources, and when the position is not consecutive to the previously determined position of the allocated persistent allocation resources, the resource allocation indicator field is set to a first value, and the A-MAP IE includes the resource offset field and the allocation size field, and
wherein, when the size is the same as the previously determined size of the allocated persistent allocation resources, and when the position is consecutive to the previously determined position of the allocated persistent allocation resource, the resource allocation indicator field is set to a second value, and the resource offset field and the allocation size field are excluded from the A-MAP IE.

8. The method according to claim 7, wherein the first value is 1.

9. The method according to claim 7, wherein the second value is 0.

10. The method according to claim 7, wherein, when the size is the same as the previously determined size of the allocated persistent allocation resources, and when the position is not consecutive to the previously determined position of the allocated persistent allocation resources, the resource allocation indicator field is set to a third value, and the A-MAP IE includes the resource offset field.

11. The method according to claim 7, wherein, when the size is different from the previously determined size of the allocated persistent allocation resources, and when the position is consecutive to the previously determined position of the allocated persistent allocation resource, the resource allocation indicator field is set to a fourth value, and the A-MAP IE includes the allocation size field.

12. A user equipment comprising:
a processor; and
a radio frequency (RF) module for transmitting and receiving an RF signal to and from an external part upon receiving a control signal from the processor,
wherein the processor, upon receiving a MAP information element (A-MAP IE) including a resource allocation indicator field from a base station through the RF module, determines a size and a position of persistent allocation resources allocated to the user equipment using the A-MAP IE,
wherein the resource allocation indicator field indicates whether an allocation size field indicating the size of the persistent allocation resources and a resource offset field indicating the position of the persistent allocation resources as an offset value are included in the A-MAP IE,
wherein a value of the resource allocation indicator field is determined according to a comparison result acquired from the base station that compares the size and the position with a previously determined size and a previously determined position of the allocated persistent allocation resources, wherein, when the size is different from the previously determined size of the allocated persistent allocation resources, and when the position is not consecutive to the previously determined position of the allocated persistent allocation resources, the resource allocation indicator field is set to a first value, and the A-MAP IE includes the resource offset field and the allocation size field, and wherein, when the size is the same as the previously determined size of the allocated persistent allocation resources, and when the position is consecutive to the previously determined position of the allocated persistent allocation resource, the resource allocation indicator field is set to a second value, and the resource offset field and the allocation size field are excluded from the A-MAP IE.

13. The user equipment according to claim 12, wherein the first value is 1.

14. The user equipment according to claim 13, wherein the processor is controlled to recognize a predetermined amount of resources as persistent allocation resources allocated to the user equipment, and wherein the predetermined resources are spaced apart from the previously determined position by a predetermined value indicated by the resource offset field and occupy a predetermined size indicated by the allocation size field.

15. The method according to claim 12, wherein the second value is 0.

16. The user equipment according to claim 15, wherein the processor is controlled to recognize a predetermined amount of resources as persistent allocation resources allocated to the user equipment, and wherein the predetermined resources start just after the previously determined position and occupy as much resources as the previously determined size.

17. The user equipment according to claim 12, wherein, when the size is the same as the previously determined size of the allocated persistent allocation resources, and when the position is not consecutive to the previously determined position of the allocated persistent allocation resources, the resource allocation indicator field is set to a third value, and the A-MAP IE includes the resource offset field.

18. The user equipment according to claim 12, wherein, when the size is different from the previously determined size of the allocated persistent allocation resources, and when the position is consecutive to the previously determined position of the allocated persistent allocation resource, the resource allocation indicator field is set to a fourth value, and the A-MAP IE includes the allocation size field.

* * * * *